(12) United States Patent
Theisen

(10) Patent No.: US 7,501,942 B2
(45) Date of Patent: Mar. 10, 2009

(54) DEVICE FOR TRIGGERING RESTRAINT MEANS

(75) Inventor: Marc Theisen, Besigheim (DE)

(73) Assignee: Robert Bosch GmbH, Stuttgart (DE)

( * ) Notice: Subject to any disclaimer, the term of this patent is extended or adjusted under 35 U.S.C. 154(b) by 235 days.

(21) Appl. No.: 10/512,729

(22) PCT Filed: Nov. 18, 2003

(86) PCT No.: PCT/DE03/03818

§ 371 (c)(1),
(2), (4) Date: Jun. 23, 2005

(87) PCT Pub. No.: WO2004/096612

PCT Pub. Date: Nov. 11, 2004

(65) Prior Publication Data

US 2005/0234623 A1    Oct. 20, 2005

(30) Foreign Application Priority Data

Apr. 30, 2003  (DE) ............................. 103 19 443

(51) Int. Cl.
*G08B 29/00* (2006.01)

(52) U.S. Cl. .................. 340/507; 340/425.5; 340/431

(58) Field of Classification Search ............... 340/507, 340/425.5, 431, 438, 687, 686.1, 689; 73/862, 73/862.01, 862.041, 862.07
See application file for complete search history.

(56) References Cited

U.S. PATENT DOCUMENTS

| 5,825,284 | A | 10/1998 | Dunwoody et al. | |
|---|---|---|---|---|
| 6,223,114 | B1 * | 4/2001 | Boros et al. | 701/70 |
| 6,452,487 | B1 | 9/2002 | Krupinski | |
| 6,668,225 | B2 * | 12/2003 | Oh et al. | 701/70 |
| 6,688,225 | B2 * | 2/2004 | Shields | 101/364 |
| 6,829,943 | B2 * | 12/2004 | Weyand et al. | 73/760 |
| 7,104,614 | B2 * | 9/2006 | Heuer et al. | 303/140 |
| 7,284,769 | B2 * | 10/2007 | Breed | 280/735 |
| 2003/0141965 | A1 | 7/2003 | Gunderson et al. | |

FOREIGN PATENT DOCUMENTS

| DE | 697 07 148 | 3/2002 |
|---|---|---|
| JP | 352373 | 4/2003 |

* cited by examiner

*Primary Examiner*—Daryl C Pope
(74) *Attorney, Agent, or Firm*—Kenyon & Kenyon LLP

(57) ABSTRACT

A device, for controlling a vehicle-occupant restraining device in a vehicle having a trailer, includes an arrangement for controlling the vehicle-occupant restraining device as a function of at least one signal of the trailer.

18 Claims, 2 Drawing Sheets

DEVICE FOR TRIGGERING RESTRAINT MEANS

BACKGROUND INFORMATION

It is known from German Patent No. DE 697 07 148 T2 to calculate the load transfer ratio and the height of the center of gravity for a vehicle trailer system to consequently display the probability of a vehicle rollover to the vehicle driver. The vehicle driver may then use this information to operate the vehicle more safely, thereby reducing the occurrence of rollover accidents.

A disadvantage in this case is that the rollover probability is only displayed and not automatically further processed and provided to other systems in the vehicle.

An object of the present invention is to further refine the device such that a signal from the trailer is automatically further processed in a safety system.

SUMMARY OF THE INVENTION

The device of the present invention for controlling restraining means in a vehicle having a trailer has the advantage that information regarding the trailer is included in the deployment decision for the restraining means. As a result, the increased total mass of the vehicle/trailer combination in a crash and the increased risk of a rollover accident are able to be taken into consideration in the deployment decision for the restraining means or the rollover bar. This allows improved passenger protection.

It is particularly advantageous that the signal which takes the trailer into consideration in the deployment algorithm for the restraining means only indicates the presence of the trailer. As a result, the deployment algorithm is able to use worst case scenario analysis to take the influence of the trailer into consideration, for example. The presence of the trailer may be generated, for example, via a circuit which may be coupled to an electrical trailer coupling. Vehicles having a trailer coupling have a turn indicator light in the driver's field of vision which blinks only once when the turn indicator is operated and there is no electrical load at the electrical coupling for the trailer and which blinks during the entire operation of the turn indicator when there is an electrical load. In a very simple variation, this signal is used to deduce an increased vehicle load.

However, since the signal may indicate an illuminated trailer as well as an illuminated bicycle rack, additional information is needed for clarification. This additional information is transmitted from the trailer to the towing vehicle. An electrical connector or another communication connection between the vehicle and the trailer may be used for this purpose. This signal may also indicate only the presence of the trailer or additional special information regarding weight and driving condition. Information about weight and driving condition may include, for example, the curb weight as the minimum weight, the total weight, the load distribution, or information regarding oscillatory movements. The total weight and the load distribution may be determined via pressure or weight sensors at one, two, or more axles of the trailer or via a pressure sensor between the coupling head of the towing vehicle and the coupling jaw of the trailer. The oscillatory movements may be determined, for example, via friction sensors between the coupling head of the towing vehicle and the friction elements in the coupling jaw of the trailer. This information provided by the trailer may be transmitted via the electrical coupling to the towing vehicle and provided to the control unit of the restraining means, such as airbags or seatbelt tensioners, the control unit of the rollover bar, and other systems for increasing occupant safety, such as the seat control unit or the reversible seatbelt tensioners.

In the case of increased oscillatory movements of the trailer, this information makes it possible, for example, to sensitize the deployment decision for the rollover bar or to operate the reversible seatbelt tensioner to bring the driver and front passenger to an optimum sitting position and to warn the driver of the increased danger. This warning is a haptic warning in this case. In addition, the increased mass and consequently reduced braking effect of the towing vehicle are able to be taken into consideration in the deployment decision for the restraint and safety systems. Moreover, the knowledge of the increased mass may be used to better predict the impact speed via precrash signals. All this information is used as input data in the control unit of the restraint and safety systems. This control unit has at least one processor on which an algorithm is executed and which makes the deployment or activation decision for the restraint and safety systems. Therefore, within this total system, additional information from the trailer is made available to the control unit in the towing vehicle to render possible a more sensitive, precise, and robust deployment decision for the safety and restraint systems and to warn the driver of an increased swerving hazard.

DETAILED DESCRIPTION

In current systems, the deployment decision for the restraining means in a vehicle, e.g., airbags or seatbelt tensioners, is based on information from acceleration sensors or precrash sensors.

The present invention provides including the trailer load directly in the triggering decision, thereby resulting in more precise deployment of the restraining means and the rollover bar. The trailer load results in a lower maximum deceleration of the vehicle/trailer combination so that trailer load information may be used as a correction value when predicting the impact speed during the evaluation of precrash signals. Moreover, the increased mass may be used in the evaluation of the acceleration signals measured, for example, by the upfront sensors or the central acceleration sensor. A vehicle/trailer combination is also more susceptible to swerving and is therefore at a greater risk of a rollover accident. As a result, the trailer information in particular should be taken into consideration when detecting a rollover occurrence.

Figure 1:
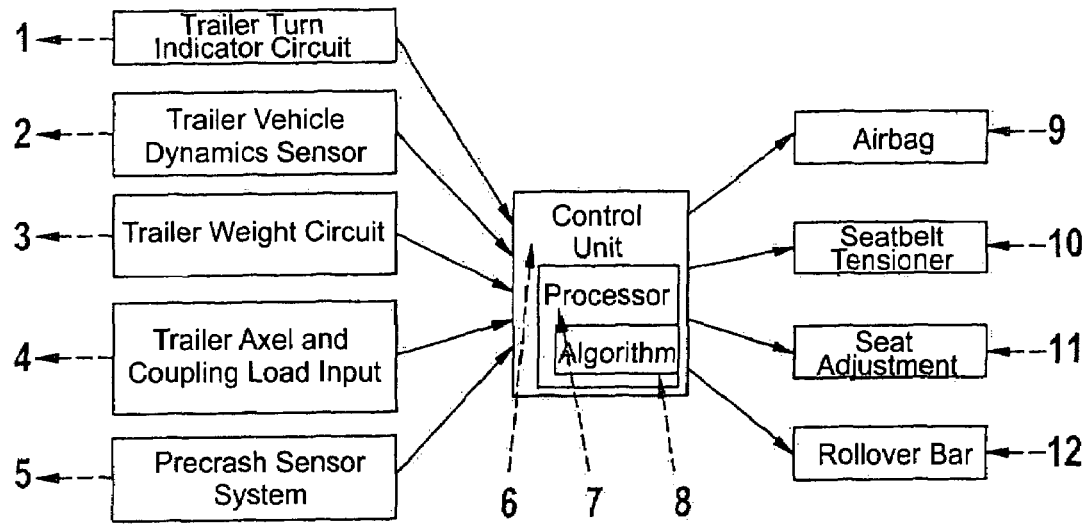
FIG. 1 shows a block diagram of the device of the present invention.

FIG. 1 shows a block diagram of the device of the present invention for controlling restraining means in a vehicle having a trailer. A restraining means control unit 6 has a processor 7, on which an algorithm 8 is calculated. This algorithm 8 is used for controlling restraining means 9-12 and uses sensor signals for controlling restraining means 9-12. These sensor signals are supplied to control unit 6. However, control unit 6 also has its own acceleration sensors and in some cases rotation-rate sensors for determining the plausibility of and identifying crash or rollover occurrences. Control unit 6 receives turn indicator information 1 via a first data input from an electronic circuit which indicates whether a trailer is present. Control unit 6 receives information regarding the vehicle dynamics of the trailer from a sensor via a second data input. This may be a sensor 2 for swerving movements of the trailer, for example. In particular, this sensor may be a friction sensor situated at the coupling for recording the swerving movements of the trailer. Via a third data input, control unit 6 receives information regarding the curb weight of the trailer from a weight sensor 3 or a memory situated on the trailer. Control unit 6 receives information regarding the load on the axles and the coupling of the trailer via a fourth data input 4. This may also be taken into consideration in activating the restraining means since the load distribution influences a rollover occurrence and the vehicle dynamics of the towing vehicle. Control unit 6 is connected via a fifth data input to a precrash sensor system 5 to obtain environment information. This is important for controlling restraining means in particular. Processor 7 controls restraining means, such as airbags 9, seatbelt tensioners 10, seat adjustment 11, or a rollover bar 12, as a function of these sensor signals.

Figure 2:
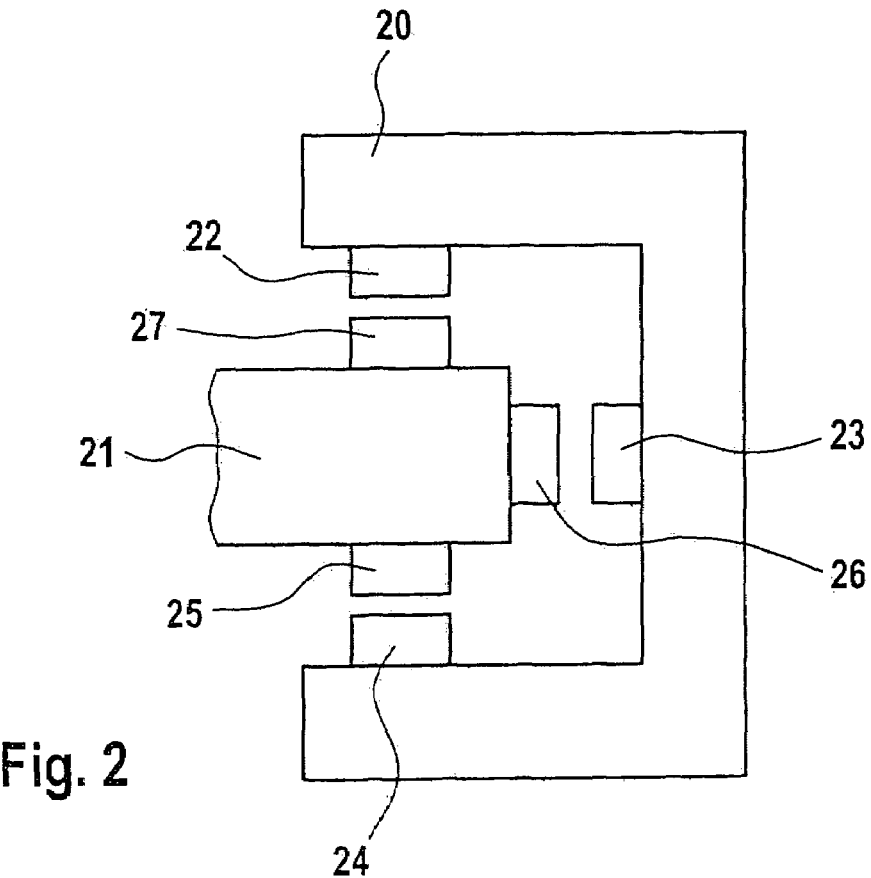
FIG. 2 shows a sensor system for oscillatory movement.

FIG. 2 shows a sensor system for detecting oscillatory movements of the trailer. A coupling head 21 has friction sensors 25, 26, and 27, while a coupling jaw 20, which belongs to the trailer, has friction elements designated by reference numerals, 22, 23, and 24 in this instance. Friction elements 22, 23, and 24 are to counteract oscillatory movements of the trailer.

Figure 3:
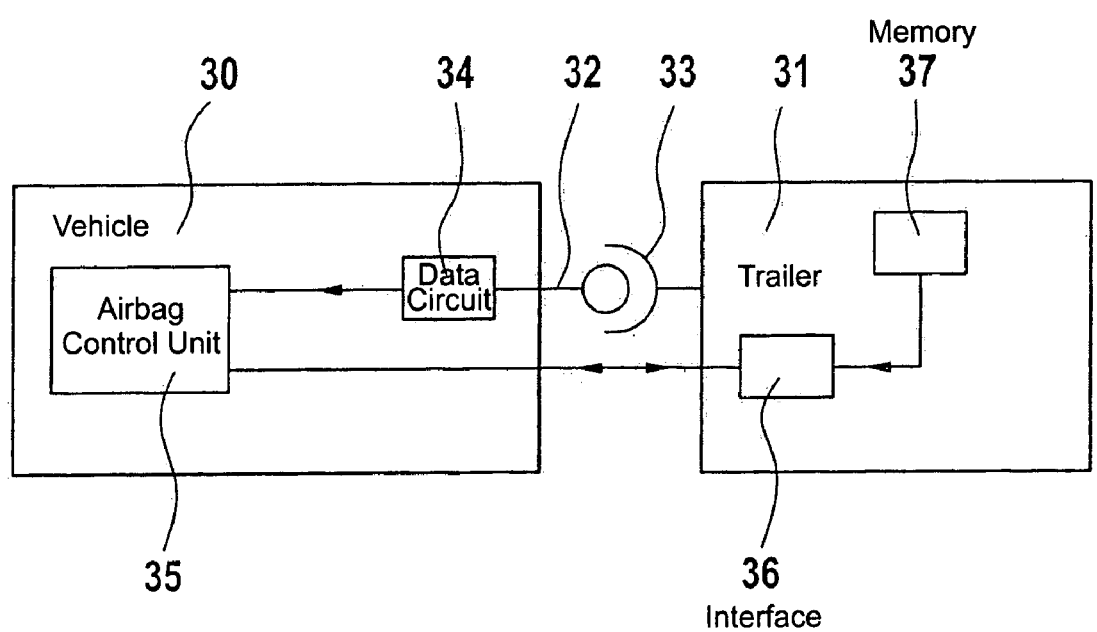
FIG. 3 shows a further block diagram of the device of the present invention.

FIG. 3 shows a further block diagram of the device of the present invention. An airbag control unit 35 having a circuit 34 connected to its data input is located in vehicle 30. Control unit 35 is connected via a data input/output and a data connection to a trailer 31 and an interface 36. This allows data exchange between the trailer and vehicle 30. In this context, information may be transmitted from the sensors in trailer 31, such as the weight sensors for determining the load distribution, or a memory 37, in which data, such as the curb weight of trailer 31, is stored, to control unit 35 so that control unit 35 takes this sensor data into consideration when calculating the deployment algorithm for the restraining means. Control unit 35 receives the information from circuit 34 as to whether trailer 31 is coupled to vehicle 30 via coupling head 32 and coupling jaw 33. Additional sensors may be situated in trailer 31 and deliver information to control unit 35 for consideration in the triggering algorithm.

What is claimed is:

1. A device for controlling a vehicle-occupant restraining device in a vehicle having a trailer, the device comprising:
    an arrangement for controlling the vehicle-occupant restraining device as a function of at least one signal of the trailer.

2. The device according to claim 1, wherein the at least one signal indicates a presence of the trailer.

3. The device according to claim 2, further comprising an electrical trailer coupling and a circuit coupled to the electrical trailer coupling, the circuit generating the at least one signal.

4. The device according to claim 1, wherein the at least one signal indicates a weight of the trailer.

5. The device according to claim 1, wherein the at least one signal indicates a load distribution of the trailer.

6. The device according to claim 1, wherein the at least one signal indicates a movement of the trailer.

7. The device according to claim 1, wherein the at least one signal is transmitted via a signal transmission from the trailer to the vehicle.

8. The device according to claim 5, further comprising a weight sensor system situated in the trailer for generating the at least one signal.

9. The device according to claim 6, further comprising a vehicle dynamics sensor system situated in the trailer for generating the at least one signal.

10. The device according to claim 6, further comprising a friction sensor system situated on a coupling head for generating the at least one signal, wherein the friction sensor system, with the aid of friction elements on a coupling jaw, detects movements of the trailer.

11. The device of claim 1, wherein the vehicle-occupant restraining device including at least one of an airbag, a seatbelt tensioner, a seat adjustment device, and a rollover bar.

12. The device of claim 1, wherein the vehicle-occupant restraining device is at least one of a driver restraining device and a passenger restraining device.

13. The device of claim 1, wherein the arrangement for controlling the vehicle-occupant restraining device includes an arrangement for bringing a vehicle occupant to an optimum sitting position.

14. The device of claim 1, wherein the arrangement for controlling the vehicle-occupant restraining device includes an arrangement for warning a driver of increased danger.

15. The device of claim 14, wherein the arrangement for warning produces a haptic warning.

16. A device for controlling a vehicle-occupant restraining device in a vehicle having a trailer, the device comprising:
    a restraining arrangement control unit to control the vehicle-occupant restraining device as a function of at least one signal of the trailer, the restraining arrangement control unit including a processor, on which an algorithm is calculated and used to control the restraining device and which uses sensor signals to control the restraining device, and including at least one of acceleration sensors and rotation-rate sensors for determining the plausibility of and identifying of at least one of crash and rollover occurrences,
    wherein the control unit receives sensor signals for:
        turn indicator information via a first data input from an electronic circuit which indicates whether a trailer is present,
        information regarding vehicle dynamics of the trailer from a friction sensor via a second data input, the friction sensor sensing swerving movements of the trailer, wherein the friction sensor is situated at the coupling for recording swerving movements of the trailer,
        information via a third data input regarding a curb weight of the trailer from at least one of a weight sensor and a memory situated on the trailer,
        information regarding a load on the axles and the coupling of the trailer via a fourth data input, wherein this information is taken into consideration in activating the restraining device since the load distribution influences a rollover occurrence and the vehicle dynamics of the towing vehicle,
        environment information via a fifth data input from a precrash sensor system;
    wherein the processor controls the restraining device, which includes at least one of airbags, seatbelt tensioners, a seat adjustment arrangement, and a rollover bar, as a function of the sensor signals;
    wherein the sensor system for detecting oscillatory movements of the trailer includes friction sensors at the coupling head, and friction elements at a coupling jaw of the trailer, has friction elements designated by reference numerals, and wherein the friction elements are to counteract oscillatory movements of the trailer.

17. The device of claim 16, wherein the vehicle includes an airbag control unit having a circuit connected to its data input, and the airbag control unit is connected via a data input/output and a data connection to the trailer and an interface, so as to allow data exchange between the trailer and the vehicle, wherein, information is transmittable to the airbag control unit from at least one of the weight sensors for determining the load distribution and a memory, in which curb weight data of the trailer is stored, so that the airbag control unit takes this sensor data into consideration when calculating the deployment algorithm for the restraining device, and wherein the airbag control unit receives the information from the circuit as to whether trailer 31 is coupled to the vehicle via the coupling head and the coupling jaw.

18. A device for controlling a vehicle-occupant restraining device in a vehicle having a trailer, the device comprising:

an arrangement for controlling the vehicle-occupant restraining device as a function of at least one signal of the trailer;

an electrical trailer coupling and at least one of a weight sensor system, a vehicle dynamics sensor system situated in the trailer, the weight sensor system and a friction sensor system situated on a coupling head, for generating the at least one signal, wherein the at least one signal indicates at least one of a presence of the trailer, a weight of the trailer, a load distribution of the trailer, and a movement of the trailer, wherein the at least one signal is transmitted via a signal transmission from the trailer to the vehicle, wherein the friction sensor system, with the aid of friction elements on a coupling jaw, detects movements of the trailer;

wherein the vehicle-occupant restraining device including at least one of an airbag, a seatbelt tensioner, a seat adjustment device, and a rollover bar, wherein the vehicle-occupant restraining device is at least one of a driver restraining device and a passenger restraining device, wherein the arrangement for controlling the vehicle-occupant restraining device includes an arrangement for bringing a vehicle occupant to an optimum sitting position, wherein the arrangement for controlling the vehicle-occupant restraining device includes an arrangement for warning a driver of increased danger, and wherein the arrangement for warning produces a haptic warning.

\* \* \* \* \*